United States Patent [19]

Auduc et al.

[11] Patent Number: 4,690,851

[45] Date of Patent: Sep. 1, 1987

[54] FABRIC BASED ON GLASS AND CARBON FIBERS AND ARTICLES COMPRISING SUCH A FABRIC

[75] Inventors: Hervé Auduc, Jonage; Jean Aucagne, La Tour du Pin, both of France

[73] Assignee: Brochier S.A., Decines Charpieu, France

[21] Appl. No.: 915,792

[22] Filed: Oct. 6, 1986

[30] Foreign Application Priority Data

Oct. 16, 1985 [FR] France ............................ 85 15328

[51] Int. Cl.$^4$ ............................................. B32B 3/12
[52] U.S. Cl. ........................................ 428/116; 428/288;
428/297; 428/367; 428/369; 428/370; 428/408;
428/902; 428/920; 428/225; 428/229
[58] Field of Search .............. 428/116, 288, 408, 297,
428/299, 300, 367, 370, 902, 920

[56] References Cited

U.S. PATENT DOCUMENTS

| 404,727 | 12/1987 | Gorges et al. | |
|---|---|---|---|
| 4,356,228 | 10/1982 | Kobayashi et al. | 428/400 |
| 4,440,819 | 4/1984 | Rosser et al. | 428/288 |
| 4,622,192 | 11/1986 | Ma | 428/288 |

FOREIGN PATENT DOCUMENTS

| 61662 | 10/1969 | Australia . |
| 2539245 | 7/1984 | France . |
| 0208240 | 11/1984 | Japan . |

*Primary Examiner*—James J. Bell
*Attorney, Agent, or Firm*—Wenderoth, Lind & Ponack

[57] ABSTRACT

A fiber-based fabric having a high fire resistance, a low weight per unit area and a good mechanical strength, comprising a mixture of:
(a) about 50–90% by weight of textured glass fibers,
(b) about 10–50% by weight of carbon fibers.

Said fabric is useful for the construction of articles for fitting out the interior of aircraft.

10 Claims, No Drawings

FABRIC BASED ON GLASS AND CARBON FIBERS AND ARTICLES COMPRISING SUCH A FABRIC

The invention relates to the field of so-called technical fabrics, that is to say fabrics which have essentially industrial uses. The subject of the invention is, more particularly, a fabric based on glass and carbon fibers, having a set of unique properties, especially a high fire resistance, a low weight per unit area and a good mechanical strength. The invention likewise relates to articles comprising such a fabric, for example articles obtained by impregnating these fabrics with a resin, if appropriate in combination with other components, thus producing structures having highly varied sectors of use, for example in the aeronautical industry.

At the present time, there is an increasing need to find new light-weight, resistant and flameproof materials. The technical problems are particularly crucial with regard to the interior fitting-out of aircraft, such as airplanes. Unfortunately, it must be said that most of the materials used are incapable of meeting all the requirements. When a fire occurs, some of them generate toxic fumes. Others produce incandescent spOts or embers or release drops which spread the fire. This is true of articles made of ABS resin (acrylonitrile-butadiene-styrene) and even of articles containing aramide fibers impregnated with phenolic resins. The latter are widely used for fitting out the interiors of airplanes because of their low unit weight and their high overall mechanical strength. They are preferred to articles based on glassfibers impregnated with phenolic resin, the mass of which is 20 to 30% higher for the same functions. However, composite materials comprising aramide fibers and phenolic resin do not have an entirely satisfactory behavior as regards fire. To meet such a requirement, it is likewise not possible to resort to thermoformable materials, such as ABS resins or polycarbonate-based resins.

There is therefore a very important need to develop completely satisfactory materials to ensure the safety of air transport. The object of the present invention is to provide a solution to this problem.

The subject of the invention is, therefore, a fiber-based fabric having a high fire resistance, a low weight per unit area and a good mechanical strength, comprising a mixture of (a) about 50–90% by weight of textured glassfibers (b) about 10–50% by weight of carbon fibers.

Such a fabric, by being impregnated with conventional resins, advantageously phenolic resins, is well suitable for producing articles, such as parts for fitting out the interior of aircraft, which have to meet a certain number of requirements simultaneously. The fabric according to the invention is designed to allow excellent impregnation with the resin, thus making it possible to obtain varied structures, for example honeycombed structures, of the type usually used for the interior fitting-out of aircraft.

The first component of the fabric according to the invention comprises textured glass fibers. The term "textured" in the meaning of the present description denotes a glass fiber with a random alignment of each filament. The technique for obtaining glass fibers also refers to broken glass fibers. This type of fiber is shown to a person skilled in the art and can be obtained in a known way by means of various treatments. The textured glass fibers used in the fabric according to the invention are continuous or discontinuous. Continuous fibers producing the best results during the oiling process are generally preferred.

In the use intended by the invention, the textured glass fibers have many advantages in comparison with non-textured glass fibers:

Textured glass fibers make it possible to obtain articles having a better surface state, since they have a resin absorption capacity clearly higher than non-textured (or smooth) glass fibers; likewise, textured glass fibers produce a better fiber/resin interface because they provide a larger surface of contact with the resin;

Fabrics and articles based on textured glass fibers have a lower mass per unit area because of the "expanded" structure of the said fibers;

In the fabrics according to the invention, because textured glass fibers are used in mixture with carbon fibers the detrimental effect of the difference in expansion between the carbon and the glass is eliminated: in fact, textured glass fibers have a random distribution of the filaments which helps to compensate for the expansions; in contrast, non-textured glassfibers mixed with carbon fibers cause warping and deformation in the finished articles;

The drapability (or deformability) of fabrics based on textured glass fibers is greater.

The invention, because of the choice of textured glass fibers, meets the requirements of the aeronautical industry. The textured glass fibers have a weight per unit length which can vary within somewhat wide limits, in particular from 11 to 126 tex (1 tex representing the number of grammes per kilometer of fiber). Good results were obtained with glass fibers of approximately 34 tex.

The second component of the fabric according to the invention comprises carbon fibers. The size of these can vary widely. Carbon fibers of 1000 to 6000 filaments are most commonly used. Good results were obtained with carbon fibers of approximately 3000 filaments.

As will be shown by means of actual examples, articles produced by impregnating the fabrics according to the invention have a completely satisfactory behaviour in respect of fire, a low mass, a suitable impact resistance and stiffness and a good surface appearance.

The relative proportions of the two components of the fabric according to the invention will be selected according to the specific problems to be solved. In fact, it is expedient to reach a compromise in view of the requirements to be met, particularly as regards the unit mass and the price. Consequently, the quantity of textured glass fibers, which amounts about 50 to 90% by weight in relation to the total weight of the fabric, is preferably between approximately 55 and 75% by weight. Correspondingly, the quantity of carbon fibers, which amounts about 10 to 50% by weight in relation to the total weight of the fabric, is preferably between 25 and 45% by weight.

According to an additional feature, the fabric according to the invention can also include a certain proportion of aramide fibers not exceeding 5 to 10% by weight of the total weight. By introducing a small quantity of aramide fibers, the behavior in respect of fire is not impaired, but the crack propagation resistance is improved.

As stated above, the fabric according to the invention is especially suitable for impregnation with a resin, usually a phenolic resin. The rate of impregnation can be high and is generally from 30 to 60%, in particular from 50 to 60%. The high capacity of the fabric to absorb the resin is beneficial for obtaining a good surface state and for bonding the fabric to the honeycombed structures conventionally used.

The combination of textured glass fibers and carbon fibers offers decisive advantages. First of all, the fire resistance of the fabric according to the invention is total, since both the glass fibers and the carbon fibers are completely inert in respect of fire. This essential characteristic must be compared with the behavior in respect of fire of aramide fibers which, even when impregnated and layered with phenolic resins, no longer conform to the standards demanded in the aeronautical industry because of the release of gas during combustion the residual incandescent spots and the rapid penetration of a flame passing through them (the firebreaking re-quirements thus not being met).

The use of textured glass fibers (random orientation of the filaments) in combination with carbon fibers also makes it possible to avoid a disadvantage found with aligned glass fibers, namely distortions attributable to the fact that the coefficients of linear thermal expansion of glass and of carbon are different, this coefficient being $5.10^{-6}$ for glass and in the neighborhood of 0 for carbon. With non-textured glassfibers, distortions (warping in particular) are found during the cooling of a part polymerized at 130° or 150° C.

The fabric according to the invention has a mass per unit area which can be as low as that of conventional aramide fabrics (for example, of the order of 170 g/m²). Parts of greater stiffness are also obtained because of the high modulus of elasticity of the combination of textured glass fibers and carbon fibers.

As mentioned above, the fabrics according to the invention can be used for manufacturing parts of cellular structure. However, in some cases, the fabric according to the invention can be used directly, after impregnation with a phenolic resin, without the need to resort to sandwich structures of the honeycombed type intended to increase the inertia of the structure. In such cases, laminates comprising several layers of fabric impregnated with resin, for example two or three layers, are then used.

The invention will now be illustrated by the following examples, without being limited in any way.

EXAMPLE 1

In this example, a basic mixture containing 57% by weight of textured glass fibers and 43% by weight of carbon fibers was used. The "textured" glass fibers had the following characteristics, as measured on a laminate of 12 layers with 27% phenolic impregnation resin:
Bending resistance: 405 MPa
Bending modulus: 23,000 MPa
Shearing resistance: 35 MPa
The dimensions of the fibers were:
Textured glass fibers: 35 tex
Carbon fibers: 3,000 filaments
A fabric having a mass per unit area of 190 g/m² was woven from this fiber mixture.

The mechanical characteristics of this fabric were as follows, as measured on laminated samples for laboratory tests comprising 12 layers of impregnated fabric:
Bending resistance: 389 MPa
Bending modulus: 31,900 MPa
Shearing resistance: 36 MPa The above fabric had been impregnated with a modified phenolic resin (Vicotex 250 of Brochier S.A.) at a rate of 55%.

The impregnated fabric was bonded to a honeycombed structure and standardized tests were conducted on the article obtained. Its behavior in respect of fire was characterized as follows:
FAR 25 standard: test passed
No residual ignition point
No apparent release of fumes.

EXAMPLE 2

In this example, a basic mixture comprising 67% by weight of textured glass fibers and 33% by weight of carbon fibers was used. The fibers were the same as those used in Example 1. The mechanical characteristics of the fabric, measured on a laminate of 12 layers, were as follows:
Bending resistance: 400 MPa
Bending modulus: 31,000 MPa
Shearing resistance: 36 MPa The behavior in respect of fire of the honeycombed articles produced from this fabric was as good as in Example 1.

EXAMPLE 3

A basic mixture comprising 65% textured glassfibers, 30% carbon fibers and 5% aramide fibers, the latter being available on the market under the brand name "KEVLAR? of DU PONT DE NEMOURS, was used in this example. The glass and carbon fibers were the same as in Examples 1 and 2. A fabric having characteristics similar to those of the fabrics of Examples 1 and 2, with a high crack propagation resistance, was obtained.

EXAMPLES 4 to 6

In these examples, various fabrics composed of textured glass fibers and carbon fibers were used to illustrate the influence of the relative proportions of these fibers on the physical and mechanical properties of laminated articles comprising 12 layers of fabric. The individual fibers have the same characteristics as in Examples 1 to 3.

The mixtures of the following fibers were therefore used:

|  | Ex. 4 | Ex. 5 | Ex. 6 |
| --- | --- | --- | --- |
| % of textured glass fibers | 90 | 80 | 50 |
| % of carbon fibers | 10 | 20 | 50 |

It was found that the values for the bending resistance and the shearing stress were of the same order of magnitude as in the articles of Examples 1 to 3.

Considerable differences arise in the mass of the fabric and in the bending modulus of the laminate.

For a given thickness of the fabric, the mass increases with the proportion of the glass fibers. The fabric of Example 4 is therefore the heaviest.

As regards the bending modulus of the laminates, the following values were found:

| Laminate | Ex. 4 | Ex. 5 | Ex. 6 |
| --- | --- | --- | --- |
| Bending modulus (MPa) | 25,400 | 27,550 | 34,000 |

The preceding examples show that a person skilled in the art can select the proportions of textured glass fibers and of carbon fibers according to the desired characteristics of the fabrics and of the impregnated articles comprising such fabrics.

The products according to the invention conform to the strictest and most recent standards of the aeronautical industry, in particular the standard proposed by the Federal Aviation Administration FAA) on 11th July 1985 under the reference NPRM 85-10A. This standard defines increased requirements as regards the behavior in respect of fire of the materials used in the interior of transport aircraft. Materials based on aramide fibers impregnated with phenolic resin cannot meet this standard. With an equal weight (for example, 175 g/m$^2$) and with the same mechanical properties, the fabrics according to the invention make it possible to obtain honeycombed panels impregnated with phenolic resin and having perfect fire resistance.

To illustrate these advantages even further, the mechanical properties of a product of the invntion, according to Example 2 above, and of a product of equal mass based on aramide fibers, according to the prior art, were compared. Laminates of 10 layers with a thickness of 2 mm and with 34% phenolic resin were used. The mass of the supporting fabric was 175 g/m$^2$. The results obtained are reported the following table.

|  | Product of the prior art | Product of Example 2 |
|---|---|---|
| Bending resistance (MPa) | 220 | 470 |
| Bending modulus (MPa) | 20,000 | 26,000 |
| Tensile strength (MPa) | 500 | 300 |
| Tension modulus (MPa) | 25,000 | 28,000 |
| Induced shearing (MPa) | 20 | 40 |
| Peeling force N/75 mm | 100 | 120 |

The above results show that the mechanical properties of the products according to the invention are at least equal to and generally superior to those of the products of the prior art based on aramide fibers. It will be recalled that the behavior of the latter in respect of fire does not meet the strictest standards proposed at present, whereas the products of the invention satisfy such requirements perfectly.

The information concerning the structure and the making process of the honey combed-type articles, as they are used particularly in the aeronautical industry for fitting out the interior of aircrafts, are known by the man skilled in the art. The book "Guide pratique de matériaux composites" 2nd edition, (1985), by M. Geier and D. Duedal, Lavoisier Editor (France) can be cited in this respect and its teaching is introduced in the present specification by way of reference.

We claim:

1. A fiber-based fabric having a high fire resistance, a low weight per unit area and a good mechanical strength, comprising a mixture of:
    (a) about 50-90% by weight of textured glass fibers,
    (b) about 10-50% by weight of carbon fibers.
2. The fabric as claimed in claim 1, comprising a mixture of:
    (a) about 55-75% by weight of textured glass fibers,
    (b) about 25-45% by weight of carbon fibers.
3. The fabric as claimed in one of claims 1 or 2, wherein it also comprises a proportion of aramide fibers not exceeding 5 to 10% by weight of the total weight.
4. The fabric as claimed in any one of claims 1 to 3, wherein the textured glass fibers have a weight per unit length of between 11 and 126 tex, in particular about 34 tex.
5. The fabric as claimed in any one of claims 1 to 4, wherein the carbon fibers comprise 1,000 to 6,000 filaments, in particular about 3,000 filaments.
6. An article comprising a fabric as claimed in any one of claims 1 to 5 and an impregnation resin.
7. The article as claimed in claim 6, wherein the impregnation resin is a phenolic resin.
8. The article as claimed in one of claims 6 or 7, wherein the proportion of resin is 30 to 60% by weight, in particular 50 to 60% by weight, in relation to the weight of the article.
9. The article as claimed in any one of claims 6 to 8, consisting of panels of honeycombed structure, the fabric as claimed in any one of claims 1 to 5 being bonded to one and/or other of the two faces of the said structure.
10. The articles as claimed in any one of claims 6 to 9 as used for fitting out the interior of aircraft, in particular airplanes.

* * * * *